(12) United States Patent
Hoelzle et al.

(10) Patent No.: US 8,918,091 B1
(45) Date of Patent: Dec. 23, 2014

(54) WIRELESS COMMUNICATION SERVICE USING SHARED SERVICE CREDENTIALS

(75) Inventors: Sean P. Hoelzle, King of Prussia, PA (US); Sara A. V. Persson, Olathe, KS (US); Robert L. Spanel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 176 days.

(21) Appl. No.: 13/586,618

(22) Filed: Aug. 15, 2012

(51) Int. Cl.
*H04M 3/00* (2006.01)
(52) U.S. Cl.
USPC ......... 455/418; 455/420; 455/414.1; 455/403
(58) Field of Classification Search
CPC ............ H04W 8/245; H04W 1/72525; H04W 1/72522
USPC ............................... 455/418, 420, 414.1, 403
See application file for complete search history.

(56) References Cited

U.S. PATENT DOCUMENTS

2012/0135719 A1* 5/2012 Haughn ................... 455/414.1
2013/0324178 A1* 12/2013 Marin et al. .................. 455/519

* cited by examiner

*Primary Examiner* — Nghi H Ly

(57) ABSTRACT

A method of provisioning a wireless device. The method comprises provisioning by a computer a first shared service credential of a first wireless device and a unique hardware identifier of the first wireless device in a wireless service provider network, wherein the first shared service credential is programmed into a plurality of different wireless devices including the first wireless device; sending by a computer a wireless access protocol message to the first wireless device directed to the first shared service credential; in response to an open mobile alliance device management rendezvous message sent by the first wireless device, transmitting by a computer a service credential to the first wireless device, where the service credential is different from the first shared service credential; and provisioning the service credential and the unique hardware identifier of the first wireless device in the wireless service provider network.

20 Claims, 9 Drawing Sheets

US 8,918,091 B1

WIRELESS COMMUNICATION SERVICE USING SHARED SERVICE CREDENTIALS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication is used for many purposes. Wireless communication may be used by mobile phones to promote nearly ubiquitous voice communication services and data communication services. Wireless communication may be used by machines for one-way or two-way communication, for example for reading utility meters remotely, for reading meteorological observation data remotely, and for other purposes. To access wireless communication networks, a wireless communication device may provide individual credentials programmed into that device by the wireless service provider as well as one or more unique hardware identifiers configured into the hardware of the device. The wireless communication network may confirm that the offered credentials and hardware identifiers are likewise provisioned in a network data store before authorizing network access for the device. When its access is authorized in this way, the device may then carry on communications.

SUMMARY

In an embodiment, a method of provisioning a wireless device is disclosed. The method comprises provisioning by a computer a first shared service credential of a first wireless device and a unique hardware identifier of the first wireless device in a wireless service provider network, wherein the first shared service credential is programmed into a plurality of different wireless devices including the first wireless device; sending by a computer a wireless access protocol (WAP) message to the first wireless device directed to the first shared service credential; in response to an open mobile alliance (OMA) device management (DM) rendezvous message sent by the first wireless device, transmitting by a computer a service credential to the first wireless device, where the service credential is different from the first shared credential; and provisioning by a computer the service credential and the unique hardware identifier of the first wireless device in the wireless service provider network.

In an embodiment, a method of provisioning a wireless device is provided. The method comprises provisioning by a computer a shared service credential and a first unique hardware identifier in a wireless service provider network provisioning store, wherein the shared service credential is programmed into a plurality of different wireless devices including a first wireless device and a second wireless device, wherein the first unique hardware identifier is associated with the first wireless device and a second unique hardware identifier is associated with the second wireless device. The method further comprises connecting to the first wireless device by addressing the first wireless device using the shared service credential, requesting the first wireless device to transmit information, receiving information transmitted by the first wireless device, and processing the information transmitted by the first wireless device. The method further comprises swapping the first unique hardware identifier with the second unique hardware identifier in the wireless service provider network provisioning store, connecting to the second wireless device by addressing the second wireless device using the shared service credential, requesting the second wireless device to transmit information, receiving information transmitted by the second wireless device, and processing the information transmitted by the second wireless device.

In an embodiment, a method of provisioning a wireless device is disclosed. The method comprises provisioning by a computer a shared service credential, wherein the shared service credential is programmed into a plurality of wireless devices, and sending by a computer a short message service (SMS) message to a first wireless device, wherein the first wireless device is one of the plurality of wireless devices. The method further comprises, after sending the short message service message, granting a data connection request from the first wireless device based on the first wireless device sending the shared service credential, receiving information transmitted by the first wireless device, and taking down the connection.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
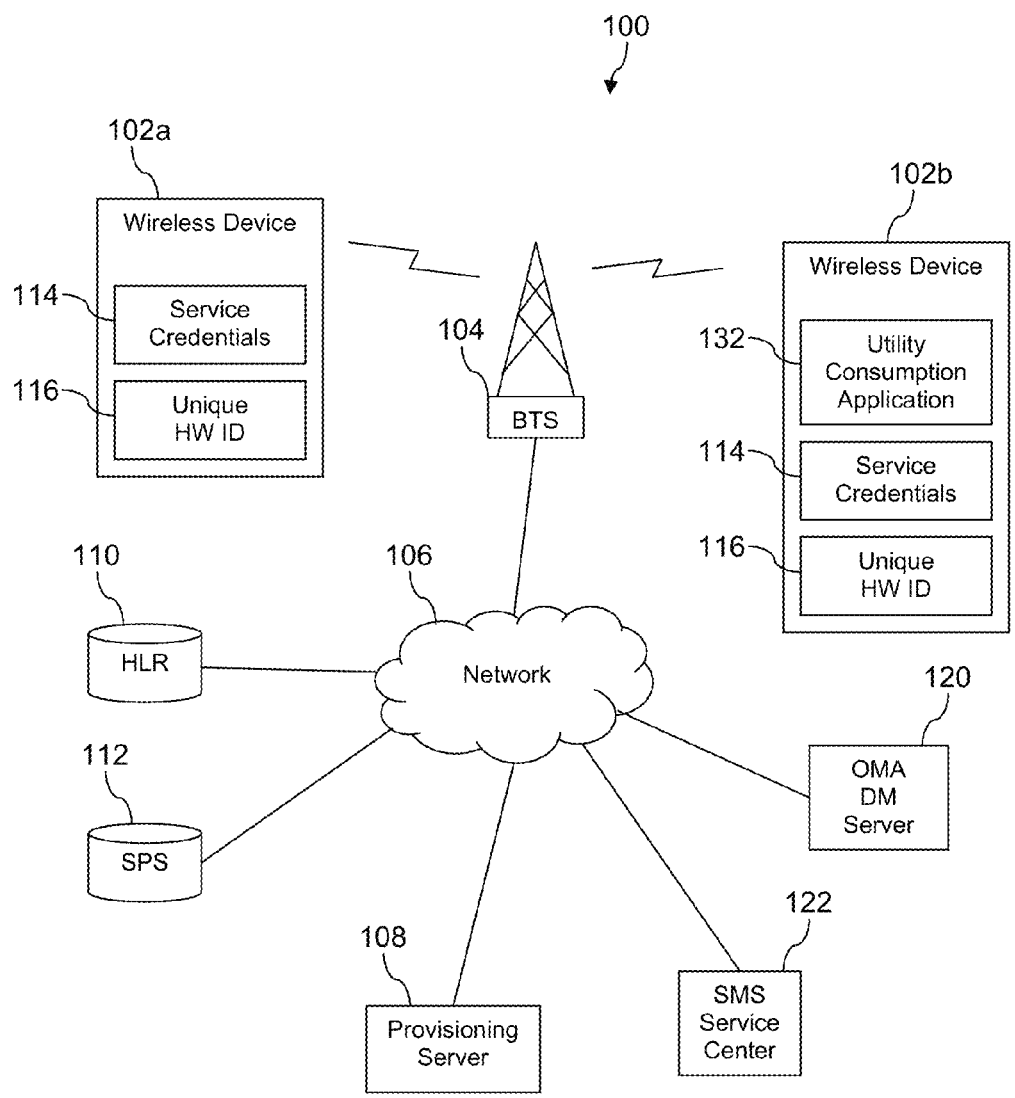
FIG. 1 is a block diagram of a communication system according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches the use of shared service credentials to provide temporary wireless communication service. The temporary wireless service may be used for a wide variety of purposes, for example, over-the-air programming of a wireless communication device, sending a customer notification to the wireless device using short message service (SMS), transmitting a wireless access protocol (WAP) message or command to the wireless device, obtaining a location fix of the wireless device, sending instructions to the wireless device to perform a 1XRTT or evolution-data only (EVDO) action, requesting and uploading monitoring information from a remote station or from a utility meter, and other purposes.

A shared service credential, such as a telephone number, may be programmed into a plurality of wireless communication devices. For example, a particular 10-digit phone number, for example 913-555-0000, may be programmed into each of a plurality of wireless devices. Typically, wireless communication service providers provision only one wireless device for wireless communication service based on a particular phone number. In an embodiment, only one of the plurality of wireless devices programmed with the shared phone number may be provisioned in the wireless network for service at a time. When the subject wireless device has completed its wireless communication, that wireless device may be deprovisioned in the network. This may be referred to as providing temporary wireless communication service to the subject wireless device. Later, another one of the wireless devices that is programmed with the shared phone number may be provisioned in the network for temporary wireless communication service in its turn. It is contemplated that a plurality of different use scenarios and/or different embodiments may benefit from this teaching.

In an embodiment, a system and method for programming a wireless communication device over-the-air using shared service credentials is described. Portions of the system and method also find application in machine-to-machine communication. As a use case, consider a wireless device, for example a mobile phone or a telematics unit installed in a vehicle, that is deprovisioned in the wireless service provider network when a subscriber wireless communication service is canceled. When the subject wireless service was initialized, the wireless device was programmed with individual and/or unique service credentials, and the wireless network was provisioned with the same individual and/or unique service credentials. When the wireless device attempted to access the wireless network, the wireless device sent the individual service credentials for authorization, and if the transmitted individual service credentials matched the individual service credentials provisioned in the network, the wireless device was granted access to the wireless network.

When the service is canceled, the traditional practice is to deprovision the individual service credentials, for example an individual phone number, in the network and leave the individual service credentials programmed into the wireless device in place. The individual service credentials may comprise limited resources and/or resources that represent invested money, hence it is economically efficient to recover and reassign these individual service credentials on the wireless network side when a service is canceled. If later it is decided to bring the wireless device back into service, the wireless device may be reset to an initial unprogrammed state, and then the standard process of programming a new wireless device may be performed.

Resetting of the wireless device to an unprogrammed state, however, may be a complicated procedure that some customers of limited technical sophistication may find intimidating or daunting. Rather than attempt to reset the wireless device on his or her own, the customer may choose to make a special trip to a retail store and ask an employee of the store to reset the wireless device, which may be an inconvenience to the customer and a cost burden to the wireless service provider. Additionally, resetting the wireless device to an unprogrammed state may undesirably delete installed applications from the wireless device. Further, some wireless devices may be remote and/or located where physical access to the wireless device may be difficult and/or costly to achieve. The present disclosure teaches a system and method that allows wireless communication service restoration on a wireless device that has been previously activated without having to physically manipulate the wireless device, for example without a user or technician having to press buttons on the wireless device.

When wireless service is canceled, the present disclosure teaches first programming one or more shared service credentials into the wireless device and, after this, deprovisioning the individual service credentials associated with the wireless device in the wireless network. The shared service credentials may comprise a shared telephone number. In some contexts, shared service credentials may be referred to as dedicated service credentials. The same shared service credentials may be programmed into a plurality of wireless devices before they are deprovisioned, for example the same telephone number such as 913-555-0000 may be programmed into a plurality of wireless devices. Shared service credentials are generally of the same form and value range as individual service credentials, they differ solely in being shared by a plurality of wireless devices. Because one set of shared service credentials may be shared by a large number of wireless devices, the economic inefficiency of losing the set of service credentials for use by an active subscription account is reduced.

When it is later desired to restore wireless communication service for the wireless device that has been programmed with a shared service credential, the user may call a customer care facility operated by the wireless communication service provider to request service renewal. The user may call using a different device, for example another wireless device or a land-line phone. Alternatively the user may contact customer care using a computer web browser. The service provider can provision or register the shared service credentials and a unique hardware identifier of the wireless device into the wireless network. This may be referred to in some contexts as provisioning the wireless device. The unique hardware identifier may be an identifier that is associated with the wireless device for all of its service life and that is not shared with any other wireless device, for example an electronic serial number (ESN). This provisioning and/or registration may comprise creating a new row entry in a network provisioning data structure, for example a home location register (HLR), where the row entry may comprise an association of the one or more shared service credentials and the unique hardware identifier. Alternatively, the provisioning or registration may comprise editing an existing row entry in a network provisioning data structure, for example the home location register, where the row entry already contains the shared service credentials, by changing the unique hardware identifier field of the row entry to the unique hardware identifier of the wireless device. The provisioning and/or registration may further comprise creating a new row entry in a service profile store.

Next, the service provider may create a service payload for the wireless device comprising a new individual service credential, store the service payload in a repository, and provision the new individual service credential and the unique hardware identifier of the wireless device into the wireless network, for example into the home location register or another network provisioning data structure. Alternatively, the service provider may provision the new individual service credential and the unique hardware identifier of the wireless device into the wireless network later.

When the new individual service credential and unique hardware is provisioned into the wireless network, at this point or later if this step is deferred, the wireless device may be said to be double provisioned in the network: once with the {shared service credentials, unique hardware identity} n-tuple and second with the {individual service credentials, unique hardware identity} n-tuple. This double provisioning may be possible where the provisioning data structure, for example the home location register, does not make the unique hardware identifier a key on the data structure.

The service provider may then send a message to the wireless device, communicating with the wireless device based on the shared service credentials of the wireless device, where the message directs the wireless device to retrieve the service payload from the repository. In response, the wireless device may send a message to the repository requesting the service payload, where the communication with the repository entails the wireless device obtaining authorization to access the wireless network based on the shared service credential of the wireless device and the unique hardware identifier of the wireless device, for example based on the shared service credential of the wireless device and the unique hardware identifier of the wireless device being provisioned into the home location register and/or into the service profile store. When the wireless device receives the service payload requested from the repository, it reprograms itself and installs the new individual service credential, for example installs a new individual telephone number. If it has not done so earlier, the service provider may provision the new individual service credential and the unique hardware identifier of the wireless device into the wireless network, for example into the home location register, into the service profile store, and/or into another network provisioning data structure.

The wireless device may then gain wireless access into the wireless network with its new individual service credential and unique hardware identifier and conduct wireless communications in the standard manner. The service provider may later deprovision the {shared service credential, unique hardware identifier} n-tuple from the wireless network, for example removing it from the home location register and/or service profile store. Alternatively, the service provider may replace the unique hardware identifier associated with the shared service credentials by a dummy value or an invalid value. In this way, the wireless device may be brought back into service without resetting to an initial state, without physical manipulation of the controls of the wireless device by either the customer or a technician, and without losing applications previously installed in the wireless device. One skilled in the art will appreciate that the subject wireless device in the above use scenario has been provided with temporary wireless communication service through the use of the shared service credential.

In an embodiment, the wireless device may be carried by a companion animal. For example, a wireless device, coupled to a dog collar attached around the neck of a dog, may comprise a global positioning system (GPS) receiver that is able to determine the position of the wireless device. The wireless device may be programmed with a shared service credential in an initial state. While the companion animal is not lost, there is no need to communicate with the wireless device, and hence provisioning an individual service credential for each of the dog collar wireless device and many other dog collar wireless devices would be economically inefficient.

When the companion animal becomes lost, the owners may call a special service company and/or the wireless service provider and request that the subject wireless device be brought into wireless communication service. The wireless device embedded in the dog collar, for example, may be programmed with an individual service credential and unique hardware identifier of the wireless device as described further above. Using the individual service credential, the special service company and/or the owner of the companion animal may call to the wireless device and retrieve the GPS coordinates of the wireless device and hence the location of the companion animal. The owner may then use the GPS coordinates to recover their companion animal.

In an embodiment, rather than being programmed with an individual service credential, the wireless device associated with the companion animal may be programmed with another shared service credential that is shared with a relatively smaller number of wireless devices, albeit wireless devices that currently desire active wireless communication service. In this embodiment, the service provider may provision each of the relatively small number of wireless devices programmed with the same shared service credential for a short duration of time in a round-robin scheduling manner. The short time duration of wireless communication service may be determined to be long enough to permit obtaining a location fix on the companion animal. For example, five wireless devices may be programmed with the same shared service credential, and each of the five wireless devices may be provisioned for 60 seconds at a time. In this manner, each wireless device may provide an updated location fix every five minutes, which may be sufficient to support finding the lost companion animal. One skilled in the art will appreciate that the wireless devices coupled to the companion animals may receive temporary wireless communication service using shared service credentials.

The provisioning of the wireless device with the individual service credential in this embodiment may automatically be deprovisioned after a predefined time interval, for example 8 hours, 24 hours, 2 days, or some other time interval. The wireless device may be reprogrammed to the shared service credential before the wireless device is deprovisioned. Alternatively, the wireless device may be programmed to automatically self-reprogram to the shared service credential after the predefined time interval. The locating devices may be subdivided into a plurality of sub-sets, where each subset of locating devices are programmed with the same shared service credentials but different shared service credentials are used by each different sub-set. In this way, locating devices that are associated with different sub-sets may be concurrently programmed with individual service credentials and used concurrently to perform location services.

In an embodiment, wireless devices may be coupled with and/or integrated into utility meters such as water meters, gas meters, electrical power distribution meters, and the like, to promote reading the meters remotely. Rather than commit a large number of individual service credentials for communicating with such utility meters, shared service credentials may be employed. In this embodiment, the wireless network may omit to provision an individual service credential in the wireless network for communicating with the wireless devices and instead communicate with the wireless device based simply on the {shared service credential, unique hardware identifier} n-tuple. In an embodiment, the wireless network may only communicate wirelessly with one device at a time based on a shared service credential.

To manage the time involved in remotely reading a large number of wireless devices coupled to utility meters, the set of wireless devices may be partitioned into a number of sub-sets, where wireless devices associated with different sub-sets may be programmed with different shared service credentials. For example, 100,000 gas meters may be partitioned into 100 sub-sets, each sub-set associated with a different shared credential. In this way, as many as 100 wireless devices may be interrogated concurrently to obtain meter readings, and the process of stepping through all the gas meters may only comprise about 1,000 iterations per shared credential. In an embodiment, the wireless device may be triggered to transmit a meter reading by pushing a message to the wireless device based on the shared service credential. The procedure of communicating with the utility meters described above may be viewed as relying on temporary wireless communication service based on using shared service credentials. While utility meters were used to describe this use case, the use case may easily be extended to apply to other devices such as printers, office equipment, geo-fencing ankle bracelets, remote telemetry equipment such as weather monitoring stations, river depth monitoring stations, ozone monitoring stations, and the like.

In some embodiments, a code division multiple access (CDMA) 1xRTT data communication protocol may be used to wirelessly communicate with the wireless devices. In another embodiment, a CDMA Evolution Data Only (EV-DO) data communication protocol may be used to wirelessly communicate with the wireless devices. In another embodiment, a long term evolution communication protocol may be used to wirelessly communicate with the wireless devices. In another embodiment, yet another wireless communication protocol may be used to communicate with the wireless devices.

Turning now to FIG. 1, a communication system 100 is described. In an embodiment, the system 100 comprises a wireless device 102a, a base transceiver station (BTS) 104, a network 106, a provisioning server 108, a home location register (HLR) 110, a service profile store (SPS) 112, an open mobile alliance (OMA) device management (DM) server 120, a short message service (SMS) service center 122, and a wireless device 102b. It is understood that the system 100 may comprise any number of wireless devices 102a, 102b, base transceiver stations 104, home location registers 110, SMS service centers 122, and OMA DM servers 120.

The network 106 may comprise a public network, a private network, or a combination thereof. The provisioning server 108, the SMS service center 122, and the OMA DM server 120 may be implemented as computers. The home location register 110 and the service profile store 112 may be data stores that are managed by computers. Computers are discussed in more detail hereinafter.

The wireless device 102a, 102b may be a mobile phone, a personal digital assistant, or a media player. The wireless device 102a, 102b may be a wireless communication module encapsulated in equipment such as a printer or a utility meter, a weather monitoring station, a river water level monitoring station, a lake water level monitoring station, an air quality monitoring station, an ozone level monitoring station, an air pollution monitoring station, or other wireless device. The wireless device 102a, 102b may have little or no human user interface, for example may have no controls other than a power switch and/or a reset switch. The wireless device 102a, 102b may be embedded in a machine such as a medical diagnostic machine. The wireless device 102a, 102b may be embedded in a machine such as a vending machine, a refrigerator, a printer, or other machine. The wireless device 102a, 102b may be embedded in a wearable device such as a dog collar or a bracelet.

The wireless device 102a, 102b may comprise a cellular radio transceiver (not shown) to promote establishing a communication link with the base transceiver station 104. The wireless device 102a, 102b may communicate with the network 106 via a wireless communication link with the base transceiver station 104 and via a wired or wireless communication link from the base transceiver station 104 to the network 106. The network 106 may provide communication coupling to the provisioning server 108, the home location register 110, the service profile store 112, the OMA DM server 120, and the SMS service center 122.

The wireless device 102a, 102b may comprise one or more service credentials stored in a service credentials storage 114 and a unique hardware identifier stored in a unique hardware identifier storage 116. The service credentials may comprise one or more of a mobile directory number (MDN), a mobile station identity (MSID), a network access identifier (NAI), a home agent internet protocol (IP) address, or a password. In an embodiment, the service credentials comprise both a mobile directory number and a mobile station identity. In an embodiment, the service credentials comprise a mobile directory number, a mobile station identity, a network access identifier, and a password. A mobile directory number may be referred to in some contexts as a mobile phone number.

The unique hardware identifier may comprise at least one of an electronic serial number (ESN), a mobile equipment identifier (MEID), or an international mobile equipment identity (IMEI). In an embodiment, the unique hardware identifier comprises an electronic serial number. In an embodiment, the unique hardware identifier comprises a mobile equipment identifier. In an embodiment, the unique hardware identifier comprises an electronic serial number and a mobile equipment identifier. In an embodiment, the unique hardware identifier comprises an international mobile equipment identity.

The service credentials storage 114 and the unique hardware identifier storage 116 may be stored in a memory of the wireless device 102a, 102b. The service credentials storage 114 may be provided in a programmable portion of memory, for example in a random access memory (RAM). The unique hardware identifier storage 116 may be provided in a non-programmable portion of memory, for example in a read only memory (ROM). In an embodiment, the hardware identifier stored in the unique hardware identifier storage 116 remains unchanged over the functional life of the wireless device 102a, 102b. In another embodiment, the unique hardware identifier storage 116 may be provided in a subscriber identity module (SIM), and the hardware identifier associated with the wireless device 102a, 102b may remain unchanged so long as the same SIM card remains installed in the wireless device 102a, 102b.

In an embodiment, the wireless device 102b comprises a utility consumption application 132 and otherwise may be substantially similar to the wireless device 102a. While the description herein after may refer primarily to the wireless device 102a, it is understood the description may equally be applied to the wireless device 102b. The service credentials storage 114 may store either individual service credentials, e.g., service credentials associated with only one wireless device 102a, or shared service credentials, e.g., service credentials shared with at least one other wireless device 102a. When the wireless device 102a is a mobile phone and/or a telematics unit embedded in a motor vehicle, the service credentials storage 114 may be initially null or unprogrammed. When the service credentials storage 114 is unprogrammed, to bring the wireless device 102a into wireless communication service, the wireless device 102a may establish a wireless communication link with the base transceiver station 104 on a slot 0 channel dedicated for provisioning such never provisioned wireless devices. The provisioning server 108 or other server may transmit individual service credentials over-the-air on the slot 0 channel via the base transceiver station 104 to the wireless device 102a, and the wireless device 102a may write the individual service credentials into the service credentials storage 114. Writing individual service credentials into the service credentials storages 114 may be referred to in some contexts as programming or partially programming the wireless device 102a.

The provisioning server 108 or other server may also provision the individual service credentials and the unique hardware identifier that is stored in the unique hardware identifier storage 116 of the subject wireless device 102a into the wireless network, for example in the home location register 110 and/or the service profile store 112. This may be referred to as registering the wireless device 102a and/or registering the service credentials and unique hardware identity of the wireless device 102a. The home location register 110 may store service credentials associated with wireless voice communication services such as a mobile directory number and/or a mobile station identity. The home location register 110 may comprise row entries defining an n-tuple of one or more service credentials and a unique hardware identifier. The service profile store 112 may provide a repository of customer and/or subscriber information as well as service credentials associated with providing wireless data communication services such as a network access identifier (NAI), a home agent internet protocol (IP) address, and/or a password. In some contexts, the service profile store 112 may be said to comprise a customer repository. The customer repository associates service credentials to unique hardware identifiers and promotes customer and/or subscriber registration into the wireless network.

In an embodiment, the service credentials storage 114 of the wireless device 102a may be initially programmed with shared service credentials, for example shipped by an original equipment manufacturer (OEM) with shared service credentials installed. Alternatively, the shared service credentials may be programmed into the service credentials storage 114 at another point in the lifecycle of the wireless device, for example by a distribution warehouse or by a retail dealer. When shared service credentials are installed in the service credentials storage 114, many machines may be shipped programmed with the same shared service credentials, thereby reducing the number of service credentials that may be consumed in providing the wireless communication services to the type of wireless device 102a.

In an embodiment, the wireless device 102a is a wireless device, for example a mobile phone or a telematics unit installed in a vehicle the wireless device 102a, and is programmed with individual service credentials in the service credentials storage 114. In an example scenario, the wireless service provided to the wireless device 102a is being canceled. In this case, the provisioning server 108 may build a device programming payload comprising shared service credentials, store the payload in the OMA DM server 120 or in a data store managed by the OMA DM server 120, and send an OMA DM rendezvous message to the wireless device 102a via the SMS service center 122. For example, the SMS service center 122 sends an OMA DM rendezvous message in an SMS message to the wireless device 102a.

The wireless device 102a conducts rendezvous with the OMA DM server 120, downloads the device programming payload, and programs itself by writing the shared service credentials into the service credentials storage 114. The provisioning server 108 confirms that the wireless device 102a has retrieved the device programming payload from the OMA DM server and then deprovisions the individual service credentials of the wireless device 102a in the wireless network, for example in the home location register 110 and the service profile store 112. In an embodiment, this deprovisioning may be accomplished by deleting a row entry or other data from the home location register 110 and/or the service profile store 112. At this point the wireless device 102a is not provisioned for wireless service in the service provider network, and if the wireless device 102a attempts to access the wireless network based on the shared service credentials stored in the service credentials storage 114 and the unique hardware identifier stored in the unique hardware identifier storage 116, the wireless network denies the access attempt. The service provider may reallocate the individual service credentials formerly allocated to the wireless device 102a to other devices.

Later, an owner and/or user of the wireless device 102a may wish to restore the wireless communication service for the wireless device 102a. For example, a vehicle having a telematics unit is sold, and the new owner wishes to enable the wireless communication functionality of the telematics unit. For example, a mobile phone that has been donated is desired to be put back into wireless communication service. For example, a mobile phone that has been lost for several months is discovered and is desired to be put back into wireless communication service.

The provisioning server 108 may identify a new individual service credential or credentials for the wireless device 102a and create a new device programming payload comprising the new individual service credential or credentials. The provisioning server 108 may transmit the new device programming payload to the OMA DM server 120. The provisioning server 108 also provisions the shared service credential or credentials and the unique hardware identifier stored in the unique hardware identifier storage 116 into the wireless network, for example in the home location register 110 and/or the service profile store 112. The owner and/or user may provide the unique hardware identifier associated with the wireless device 102a to the customer care representative to an input of a web browser interface screen. The provisioning server 108 may command the SMS service center 122 to transmit a OMA DM rendezvous message to the wireless device 102a, for example via a text message, based on the shared service credential.

The wireless device 102a performs rendezvous with the OMA DM server 120, retrieves the new device programming payload, and reprograms itself by installing the new individual service credential or credentials into the service credentials storage 114. After confirming that the wireless device 102a has completed rendezvous with the OMA DM server 120, the provisioning server 108 provisions the new individual service credential or credentials and the unique hardware identifier into the wireless network, for example in the home location register 110 and/or the service profile store 112. Alternatively, the provisioning server 108 does not confirm that the wireless device 102a has completed rendezvous and provisions the new individual service credential or credentials and the unique hardware identifier into the wireless network at about the same time it directs the SMS service center 122 to transmit the OMA DM rendezvous message to the wireless device 102a. The provisioning server may thereafter deprovision the shared service credential and the unique hardware identifier from the wireless network. At this point the wireless device 102a is restored to standard wireless service and is able to access the wireless network based on the individual service credentials and unique hardware identifier and to complete wireless communications normally.

In an embodiment, the wireless device 102a is embedded in a machine or is carried by a companion animal, for example in a dog collar, and the service credentials storage 114 is programmed with a shared service credential. Wireless communication for the wireless device 102a may be provided substantially as described above. Once the service credentials storage 114 of the wireless device 102a has been programmed with individual service credentials, the wireless device 102a may be communicated with by the wireless network, for example to retrieve GPS coordinates of a companion animal or to retrieve information from a machine in which the wireless device 102a is embedded. When the need to communicate with the wireless device 102a is completed, the wireless device 102a is reprogrammed to store the shared service credentials in the service credentials storage 114 and the individual service credentials and corresponding unique hardware identifier are deprovisioned in the wireless network.

In an alternative of this embodiment, the step of reprogramming the wireless device 102a to store individual service credentials in the service credentials storage 114 is skipped. In this case, to communicate with the wireless device 102a, 102b, the shared service credential and the unique hardware identifier are provisioned in the wireless network. The communication is completed. The unique hardware identifier is deprovisioned in the wireless network. In an embodiment, a large number of wireless devices 102a are programmed with shared service credentials, and it is desired to iteratively communicate with each of these devices in series to retrieve data such as utility consumption information. In this case the shared service credentials may be provisioned into the network, for example into the home location register 110, and the unique hardware identifier of each wireless device 102a is written over the value of the unique hardware identifier of the preceding wireless device 102a in the home location register. This may be referred to as swapping the unique hardware identifier in the home location register.

This alternative embodiment may be employed when the communication is short in duration, for example when the wireless device 102b is coupled to a utility meter and the communication comprises downloading a limited amount of information, for example a utility consumption such as monthly water consumption, monthly electric power consumption, monthly natural gas consumption, or other. The wireless device 102b may comprise a utility consumption application 132 to promote managing the utility consumption information and transmitting it. The utility consumption application 132 may also detect a trigger, such as an SMS message that indicates that the wireless device 102b is commanded to transmit its data by connecting to the network 106.

A series of meters may be read by replacing the unique hardware identifier of a first wireless device 102b in the home location register 110 by the unique hardware identifier of a second wireless device 102b in the home location register 110, overwriting the pervious unique hardware identifier over the previous unique hardware identifier to access the next wireless device 102a. This approach to reading from wireless devices 102b may apply when using a code division multiple access (CDMA) 1xRTT data communication protocol to read the subject information or data. While utility meters were used to describe this use case, the use case may easily be extended to apply to other devices such as printers, office equipment, geo-fencing ankle bracelets, remote telemetry equipment such as weather monitoring stations, river depth monitoring stations, ozone monitoring stations, and the like.

In another embodiment, the wireless device 102b may communicate and transfer information using a code division multiple access evolution data only (CDMA EV-DO) data communication protocol. The EV-DO data communication connection may be authenticated based solely on a network access identity (NAI) and a password. The wireless device 102b may be programmed such that if the network access identity is a shared network access identity, the wireless device 102b does not initiate data communication unless it first is commanded to do so. Alternatively, in an embodiment, the wireless device 102b may not initiate data communication over the CDMA EV-DO data communication connection until it receives an SMS message directed to the wireless device 102b based on shared credentials.

Figure 2:
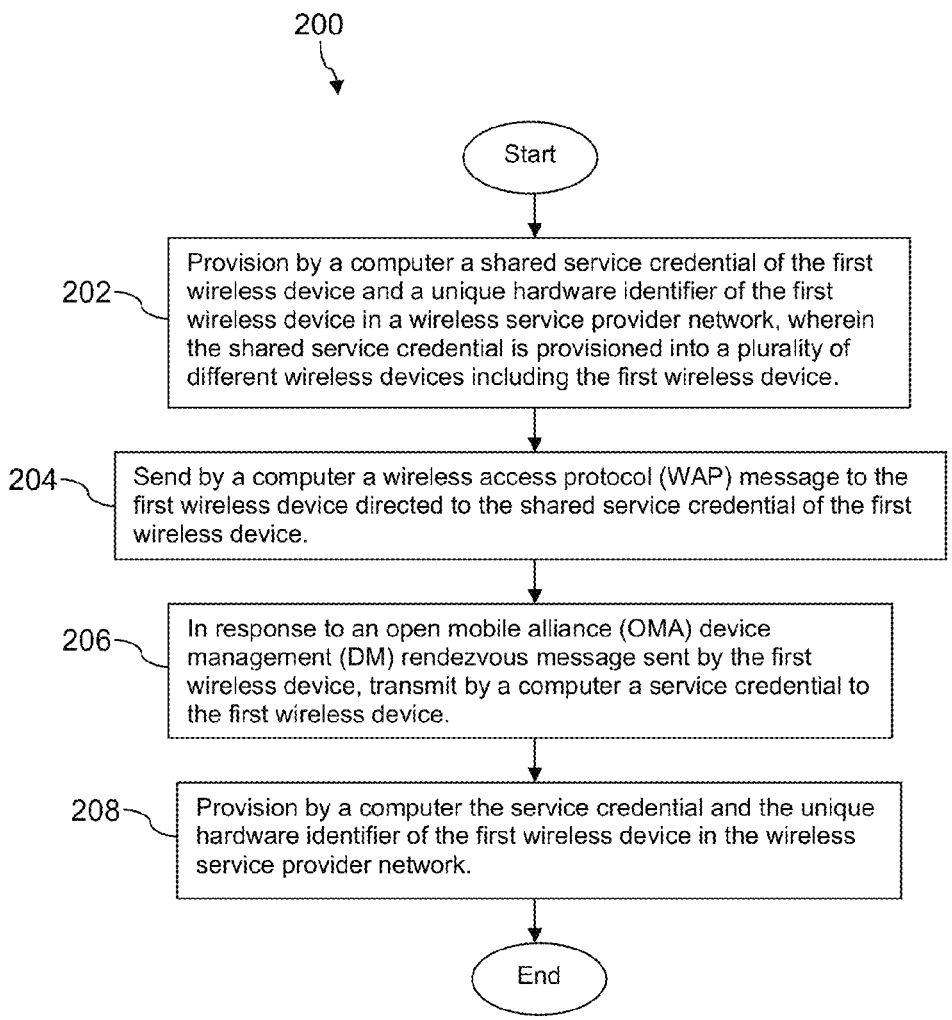
FIG. 2 is a flow chart of a method according to an embodiment of the disclosure.

Turning now to FIG. 2, a method 200 is described. At block 202, provision by a computer a shared service credential of a first wireless device and a unique hardware identifier of the first wireless device in a wireless service provider network, wherein the shared service credential is programmed into a plurality of different wireless devices including the first wireless device. The processing of block 202 may comprise the provisioning server 108 writing information into both a home location register and a service profile store. At block 204, send by a computer a wireless access protocol (WAP) message to the first wireless device directed to and/or addressed by the shared service credential of the first wireless device. The wireless access protocol message may be sent by the provisioning server 108. Alternatively, the message may be conveyed by the SMS service center 122 in a short message service (SMS) text message to the wireless device. The message may direct the first wireless device to perform an OMA DM rendezvous with the OMA DM server 120. As understood by one skilled in the art, the OMA DM rendezvous functionality may promote wireless devices receiving updates over-the-air.

At block 206, in response to an open mobile alliance (OMA) device management (DM) rendezvous message sent by the first wireless device, transmit by a computer a service credential to the first wireless device, where the service credential is different from the shared service credential. In an embodiment, the service credential may be an individual credential. In another embodiment, however, the service credential may be a second shared service credential that is different from the shared service credential. The second shared service credential may be, for example, a shared service credential that is associated with a relatively small number of wireless devices 102, each programmed with the same shared service credential, that may be provisioned serially for relatively short time durations in sequence. For example a programming payload is sent to the wireless device by the OMA DM server 120. At block 208, provision by a computer the service credential and the unique hardware identifier of the first wireless device in the wireless service provider network. For example, the provisioning server 108 writes service credentials and the unique hardware identifier into the home location register 110 and/or the service profile store 112. For example, the provisioning server 108 writes a mobile directory number (MDN), a mobile station identity (MSID), and the unique hardware identifier into the home location register 110 and writes a network access identifier (NAI) and a password into the service profile store 112.

Figure 3:
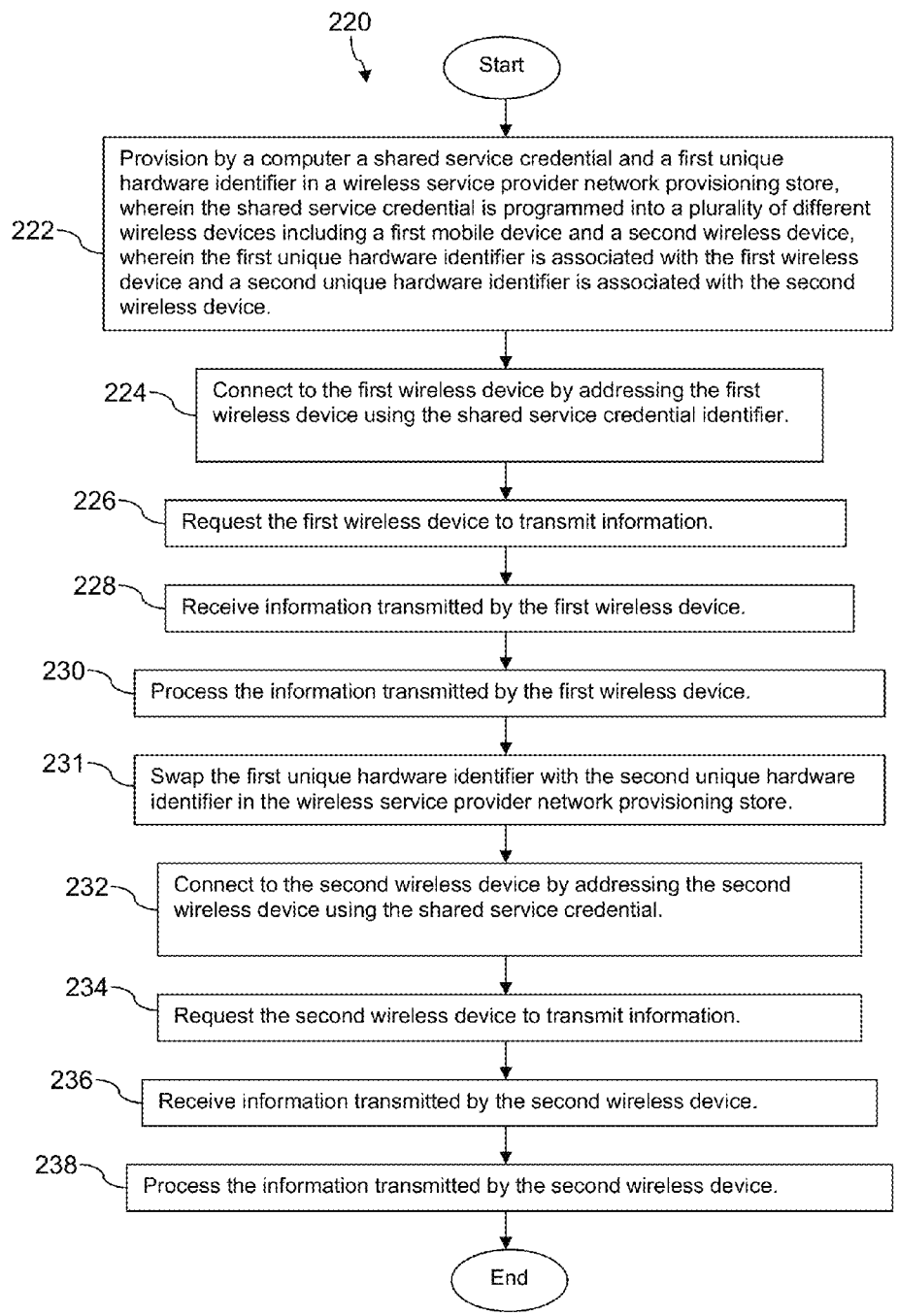
FIG. 3 is a flow chart of a method according to an embodiment of the disclosure.

Turning now to FIG. 3, a method 220 is described. At block 222, provision by a computer a shared service credential and a first unique hardware identifier in a wireless service provider network provisioning store, wherein the shared service credential is programmed into a plurality of different wireless devices including a first wireless device and a second wireless device, wherein the first unique hardware identifier is associated with the first wireless device and a second unique hardware identifier is associated with the second wireless device. For example, the provisioning server 108 writes the shared service credential or credentials and the first unique hardware identifier as a row in the home location register 110 and/or the service profile store 112. Alternatively, if the shared service credential or credentials are already present in the home location register 110, write the first unique hardware identifier over the previous unique hardware identifier in the subject entry in the home location register 110. Alternatively, if the shared service credential or credentials are already present in the service profile store 112, write the first unique hardware identifier over the previous unique hardware identifier in the subject entry in the service profile store 112.

At block 224, connect to the first wireless device by addressing the first wireless device using the shared service credential. At block 226, request the first wireless device to transmit information. At block 228, receive information transmitted by the first wireless device. At block 230, process the information transmitted by the first wireless device.

At block 231, swap the first unique hardware identifier with the second unique hardware identifier in the wireless service provider network provisioning store. For example, replace the first unique hardware identifier associated with the shared service credentials with the second unique hardware identifier in the home location register 110. At block 232, connect to the second wireless device by addressing the second wireless device using the shared service credential.

At block 234, request the second wireless device to transmit information. At block 236, receive information transmitted by the second wireless device. At block 238, process the information transmitted by the second wireless device.

Figure 4:
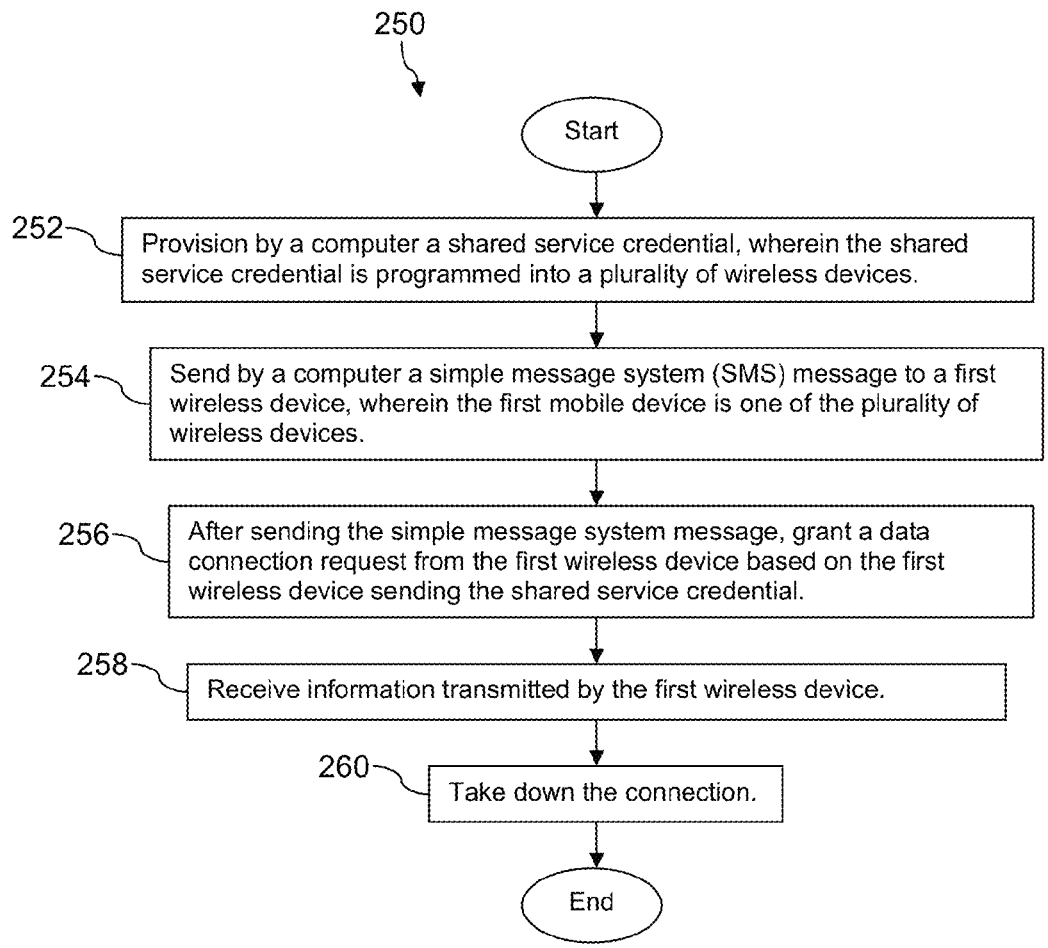
FIG. 4 is a flow chart of a method according to an embodiment of the disclosure.

Turning now to FIG. 4, a method 250 is described. At block 252, provision by a computer a shared service credentials in a wireless service provider network provisioning store, wherein the shared service credential is programmed into a plurality of wireless devices. For example, provision shared service credentials into the home location register 110 and into the service profile store 112. At block 254, send by a computer a short message service (SMS) message to a first wireless device, wherein the first wireless device is one of the plurality of wireless devices. At block 256, after sending the SMS message, grant a data connection request from the first wireless device based on the first wireless device sending the shared service credential. In an embodiment, the data connection may be a code division multiple access evolution data only (CDMA EV-DO) data connection. At block 258, receive information transmitted by the first wireless device. At block 260, take down the connection.

Figure 5:
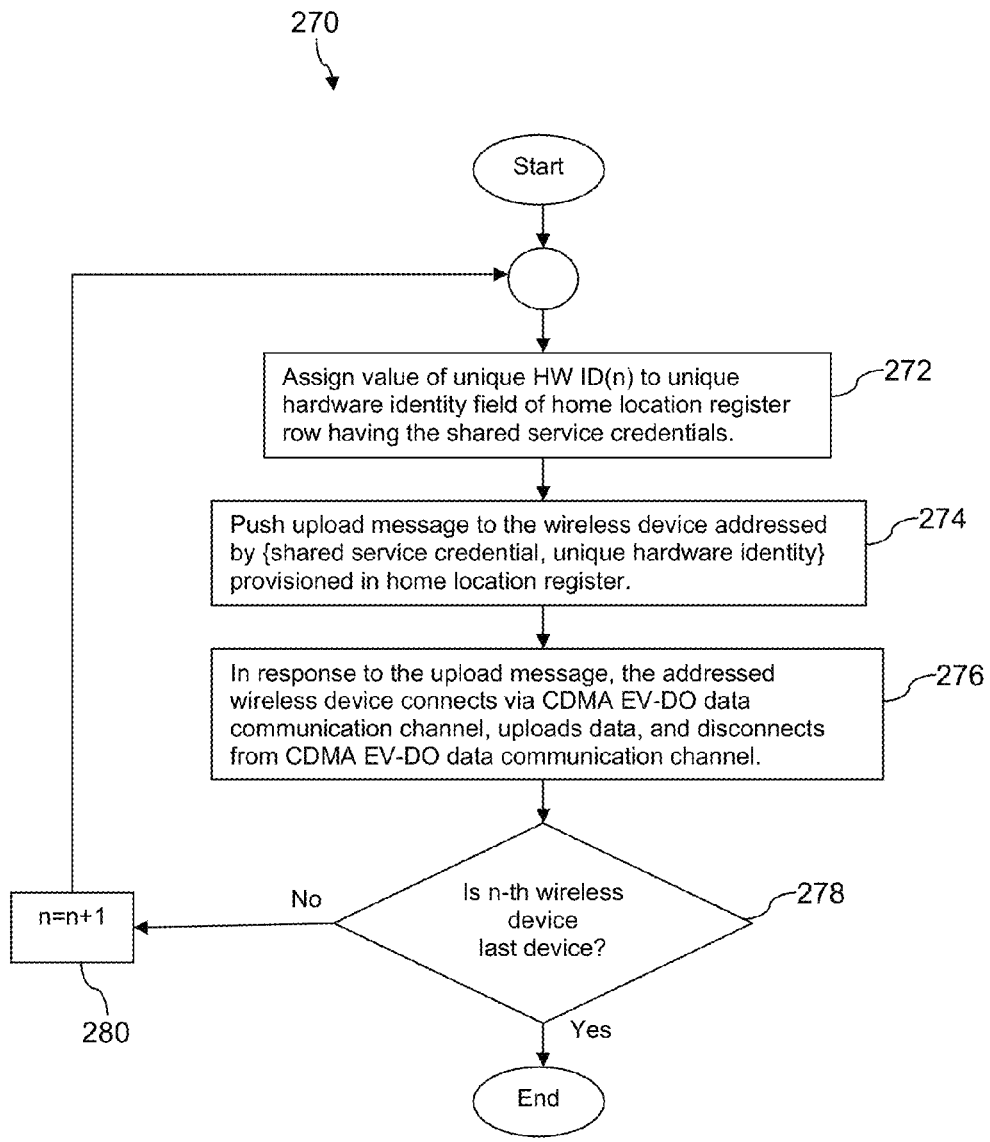
FIG. 5 is flow chart of a method according to an embodiment of the disclosure.

Turning now to FIG. 5, a method 270 is described. At block 272, a unique hardware identity of a first wireless device 102b is assigned to an entry or row in the home location register 110, where the entry has already had shared service credentials assigned. The processing of block 272 may be said to register the first wireless device 102b based on the shared service credentials. At block 274, an upload message and/or command is pushed to the first wireless device 102b. The upload message is transmitted at least in part over-the-air based on and/or addressed using the shared service credentials of the first wireless device 102b.

At block 276, in response to receiving the upload message, the first wireless device 102b connects via a code division multiple access evolution data only (CDMA EV-DO) data communication channel and uploads data. The wireless device 102b connects via CDMA EV-DO based on shared service credentials such as network access identifier (NAI) and password stored in the service profile store 112. The data may be utility consumption data and/or other data. In an embodiment, the utility consumption application 132 is triggered by the upload message and mediates the establishment of the CDMA EV-DO communication channel. Additionally, the utility consumption application 132 may respond to the upload message by calculating and/or determining a utility consumption report based on analyzing a plurality of measurements and/or logs stored in the wireless device 102b and/or a utility meter to which the wireless device 102b is coupled.

At block 278, if the wireless device 102b is the last to upload information, the method 270 ends. If other wireless devices 102b remain to upload information, the method proceeds to block 280. At block 280, the wireless device index increments. One skilled in the art will appreciate that the method 270 may be iterated as many times as there are wireless devices 102b assigned the value of the subject shared service credentials in their service credentials 136. If a plurality of wireless devices 102b have been subdivided into a plurality of sub-sets, where each of the wireless devices 102b assigned to one sub-set store the same shared service credentials in their service credentials storage 114, a plurality of instances of the method 270 may be executed concurrently, one instance for every sub-set of wireless devices 102b.

Figure 6:
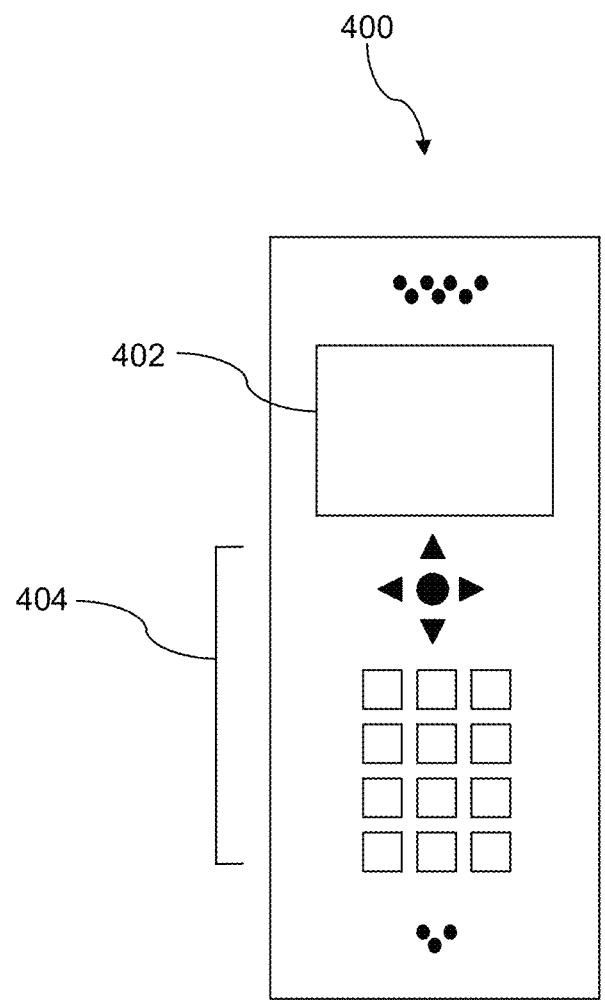
FIG. 6 is an illustration of a mobile phone according to an embodiment of the disclosure.

FIG. 6 depicts a wireless device 400, which is operable for implementing an embodiment of the present disclosure. Though illustrated as a mobile phone, the wireless device 400 may take various forms including a wireless handset, a pager, a personal digital assistant (PDA), a gaming device, or a media player. The wireless device 400 includes a display 402 and a touch-sensitive surface and/or keys 404 for input by a user. The wireless device 400 may present options for the user to select, controls for the user to actuate, and/or cursors or other indicators for the user to direct. The wireless device 400 may further accept data entry from the user, including numbers to dial or various parameter values for configuring the operation of the handset. The wireless device 400 may further execute one or more software or firmware applications in response to user commands. These applications may configure the wireless device 400 to perform various customized functions in response to user interaction. Additionally, the wireless device 400 may be programmed and/or configured over-the-air, for example from a wireless base station, a wireless access point, or a peer wireless device 400. The wireless device 400 may execute a web browser application which enables the display 402 to show a web page. The web page may be obtained via wireless communications with a base transceiver station, a wireless network access node, a peer wireless device 400 or any other wireless communication network or system.

Figure 7:
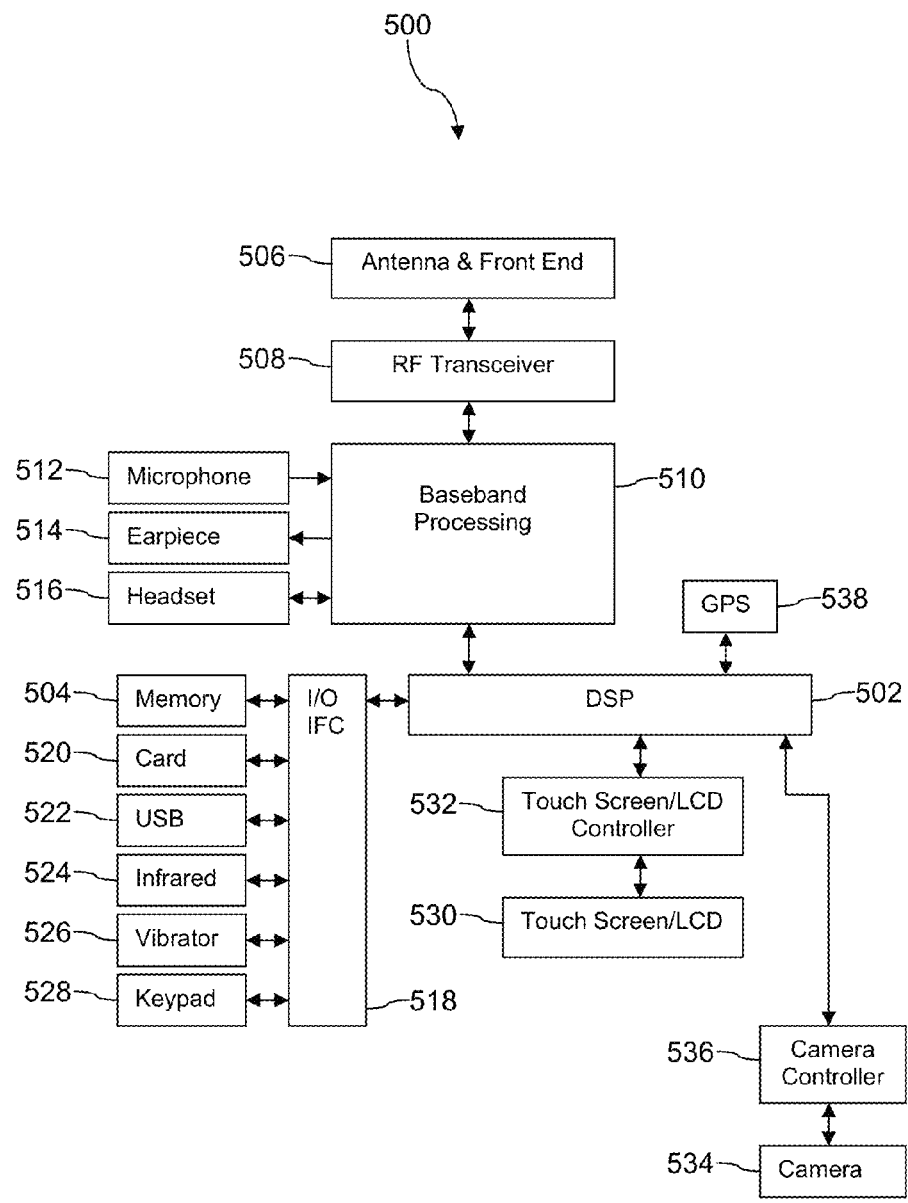
FIG. 7 is a block diagram of a hardware architecture of a wireless device according to an embodiment of the disclosure.

FIG. 7 shows a block diagram of a wireless device 500. Devices that may be implemented substantially in conformance with the described wireless device 500 may be considered to include the wireless device 400 as well as other variant devices, for example wireless devices that do not have a customary human user interface, for example wireless devices designed for machine-to-machine (M2M) applications. While a variety of common components are depicted, in an embodiment a subset of the listed components and/or additional components not listed may be included in the wireless device 500. The wireless device 500 includes a digital signal processor (DSP) 502 and a memory 504. As shown, the wireless device 500 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the wireless device 500 may include another kind of display that does not provide a touch sensitive screen. In an embodiment, the DSP 502 may communicate directly with the memory 504 without passing through the input/output interface 518. Additionally, in an embodiment, the wireless device 500 may comprise other peripheral devices that provide other functionality.

The DSP 502 or some other form of controller or central processing unit operates to control the various components of the wireless device 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the wireless device 500 to function as a peripheral device to exchange information with a personal computer or other computer system. The infrared port 524 and other optional ports such as a Bluetooth® interface or an IEEE 802.11 compliant wireless interface may enable the wireless device 500 to communicate wirelessly with other nearby handsets and/or wireless base stations.

The keypad 528 couples to the DSP 502 via the interface 518 to provide one mechanism for the user to make selections, enter information, and otherwise provide input to the wireless device 500. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the wireless device 500 to determine its position.

Figure 8A:
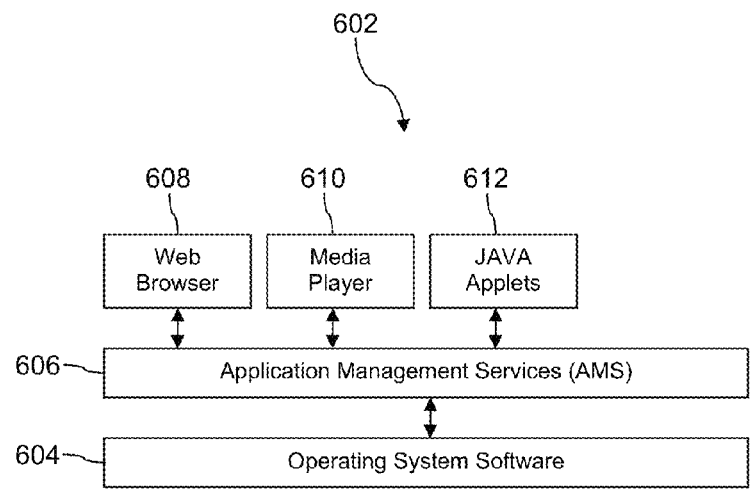
FIG. 8A is a block diagram of a software architecture of a wireless device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the wireless device 500. Also shown in FIG. 8A are a web browser application 608, a media player application 610, and JAVA applets 612. The web browser application 608 may be executed by the wireless device 500 to browse content and/or the Internet, for example when the wireless device 500 is coupled to a network via a wireless link. The web browser application 608 may permit a user to enter information into forms and select links to retrieve and view web pages. The media player application 610 may be executed by the wireless device 500 to play audio or audiovisual media. The JAVA applets 612 may be executed by the wireless device 500 to provide a variety of functionality including games, utilities, and other functionality.

Figure 8B:
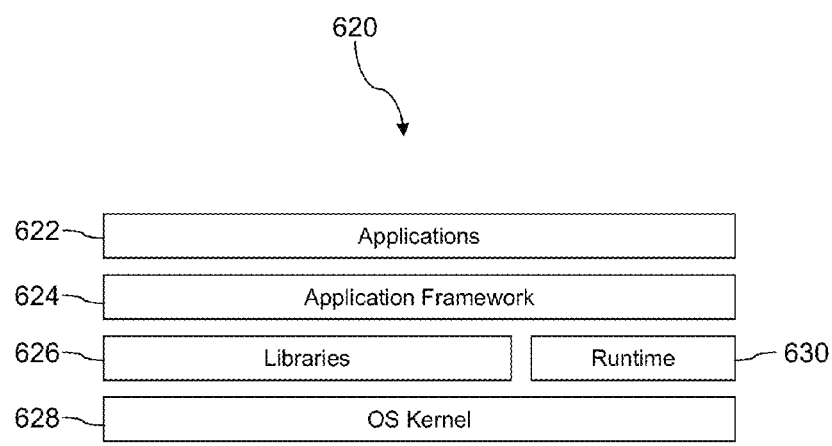
FIG. 8B is a block diagram of another software architecture of a wireless device according to an embodiment of the disclosure.

FIG. 8B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
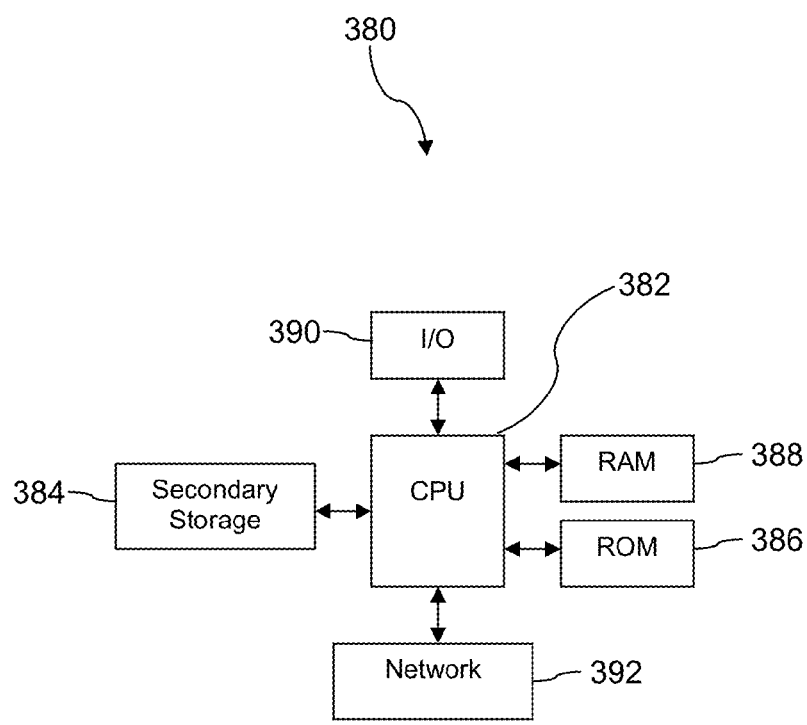
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of provisioning a wireless device, comprising:
   provisioning, by a computer, a shared service credential of a wireless device and a unique hardware identifier of the wireless device in a wireless service provider network, wherein the shared service credential is programmed into a plurality of different wireless devices including the wireless device;
   sending, by a computer, a wireless access protocol (WAP) message to the wireless device directed to the shared service credential;
   in response to an open mobile alliance (OMA) device management (DM) rendezvous message sent by the wireless device, transmitting, by a computer, a service credential to the wireless device, where the service credential is different from the shared service credential; and
   provisioning, by a computer, the service credential and the unique hardware identifier of the wireless device in the wireless service provider network.

2. The method of claim 1, wherein the shared service credential comprises at least one of a mobile directory number (MDN), mobile station identity (MSID), network access identifier (NAI), home agent internet protocol (IP) address, or a password.

3. The method of claim 1, wherein the unique hardware identifier comprises at least one of an electronic serial number (ESN), a mobile equipment identifier (MEID), or an international mobile equipment identity (IMEI).

4. The method of claim 1, wherein the provisioning the shared service credential of the wireless device and the unique hardware identifier of the wireless device, the sending, the transmitting, and the provisioning the service credential is performed by at least two different computers.

5. The method of claim 1, wherein the wireless device is embedded in a telematics unit in a vehicle, and wherein the wireless device does not provide a user interface.

6. The method of claim 1, further comprising:
   building, by a computer, a device programming payload comprising a second shared service credential, where the second shared service credential may be the same as or different from the shared service credential;
   storing, by an open mobile alliance (OMA) device management (DM) server computer, the device programming payload;
   sending, by a computer, a wireless access protocol message to the wireless device, wherein the wireless access protocol message instructs the wireless device to rendezvous with the open mobile alliance device management server computer; and
   after the wireless device has retrieved the device programming payload from the open mobile alliance device management server computer, deprovisioning the service credential and the unique hardware identifier.

7. The method of claim 1, wherein the service credential is an individual service credential.

8. The method of claim 1, wherein the service credential is a second shared service credential, wherein the second shared service credential is different from the shared service credential.

9. The method of claim 1, wherein the wireless device is mobile phone.

10. The method of claim 1, wherein the shared service credential of the wireless device and the unique hardware identifier of the wireless device are provisioned in the wireless service provider network in response to cancellation of wireless service on the wireless device.

11. The method of claim 1, further comprising deprovisioning, by a computer, an individual service credential associated with the wireless device in the wireless service provider network.

12. The method of claim 11, wherein the deprovisioning occurs subsequent to the provisioning the shared service credential of the wireless device and the unique hardware identifier of the wireless device in the wireless service provider network.

13. The method of claim 1, wherein the plurality of different mobile devices that comprise the shared service credential are provided with temporary wireless communication service with only one of the plurality of wireless devices allowed to be provisioned in the wireless service provider network for temporary service at a time using the shared service credential.

14. The method of claim 1, wherein the wireless device accesses the wireless service provider network and conducts standard wireless communications using the service credential and the unique hardware identifier.

15. The method of claim 1, further comprising deprovisioning, by a computer, the shared service credential and the unique hardware identifier in the wireless service provider network.

16. The method of claim 15, wherein the deprovisioning comprises removing an association of the shared service credential and the unique hardware identifier from at least one of a home location register or a service profile store.

17. The method of claim 1, wherein the wireless device comprises a global positioning system receiver secured to a companion animal.

18. The method of claim 17, further comprising receiving information transmitted by the wireless device, wherein the information received from the wireless device comprises global positioning system coordinates of the companion animal.

19. The method of claim 1, wherein the provisioning the shared service credential and the unique hardware identifier of the wireless device in the wireless service provider network comprises adding an association of the shared service credential and the unique hardware identifier of the wireless device to at least one of a home location register and a service profile store.

20. The method of claim 1, further comprising:
provisioning, by a computer, the shared service credential and a unique hardware identifier of a second wireless device of the plurality of different wireless devices in the wireless service provider network;
subsequent to the provisioning the service credential and the unique hardware identifier of the wireless device in the wireless service provider network, sending, by a computer, a second wireless access protocol (WAP) message to the second wireless device directed to the shared service credential;
in response to a second open mobile alliance (OMA) device management (DM) rendezvous message sent by the second wireless device, transmitting, by a computer, a second service credential to the second wireless device, where the second service credential is different from the shared service credential; and
provisioning, by a computer, the second service credential and the unique hardware identifier of the second wireless device in the wireless service provider network.

* * * * *